United States Patent [19]
McDaniels

[11] Patent Number: 5,098,644
[45] Date of Patent: Mar. 24, 1992

[54] APPARATUS FOR CONSOLIDATION OF SPENT NUCLEAR FUEL RODS

[75] Inventor: John D. McDaniels, Duluth, Ga.
[73] Assignee: Nuclear Assurance Corporation, Norcross, Ga.
[21] Appl. No.: 570,812
[22] Filed: Aug. 22, 1990
[51] Int. Cl.⁵ .............................. G21C 19/32
[52] U.S. Cl. ............................... 376/261
[58] Field of Search ............ 376/261, 260, 272
[56] References Cited

U.S. PATENT DOCUMENTS

| | | | |
|---|---|---|---|
| 4,474,727 | 10/1984 | Kmonk et al. | 376/272 |
| 4,659,536 | 4/1987 | Baudro | 376/261 |
| 4,731,219 | 3/1988 | Beneck et al. | 376/261 |

OTHER PUBLICATIONS

"Simplifying Fuel Rod Consolidation", Lee, NEI 9/89.

Primary Examiner—Daniel D. Wasil
Attorney, Agent, or Firm—David P. Kelley

[57] ABSTRACT

An apparatus for the consolidation of spent nuclear fuel rods within a storage pool uses a robot in conjunction with long reach tools to remove spent fuel rods from a rod assembly and transfer them to a fuel rod consolidation canister. A movable curtain within the canister aligns and locates the rods for most efficient use of space. A tool guide plate enables the long reach rod grasping tool to locate each rod in the fuel cell accurately.

18 Claims, 4 Drawing Sheets

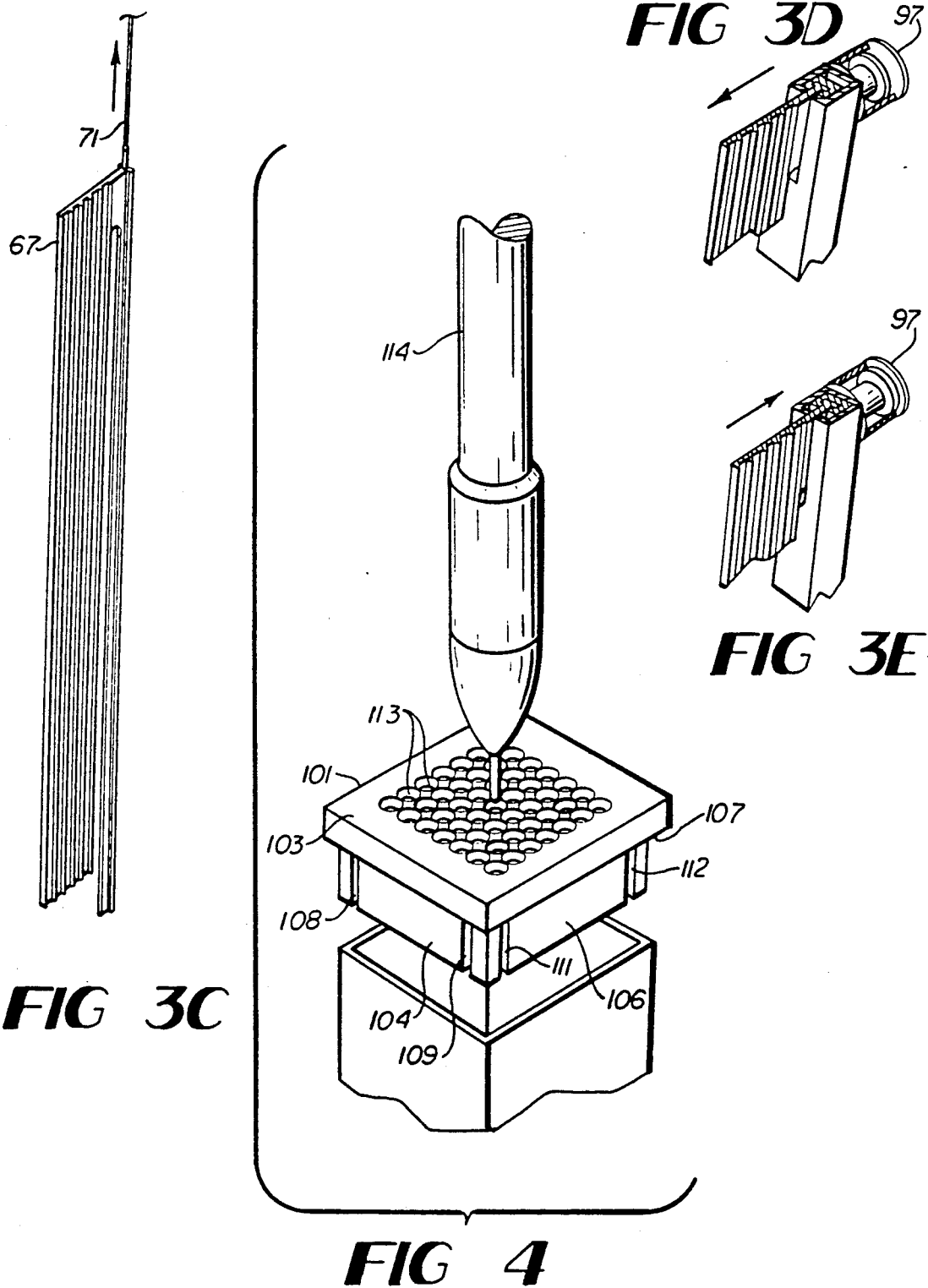

APPARATUS FOR CONSOLIDATION OF SPENT NUCLEAR FUEL RODS

TECHNICAL FIELD

This invention relates to spent nuclear fuel rod storage, and, more particularly, to a method and apparatus for consolidating spent nuclear fuel rods.

BACKGROUND OF THE INVENTION

Nuclear fuel assemblies, for powering nuclear reactors, generally consist of large numbers of fuel rods contained in discrete fuel rod assemblies. These assemblies or cells generally consist of a bottom end fitting or nozzle, a plurality of fuel rods extending upwardly therefrom and spaced from each other in a square pitch configuration, orientating or support grids spaced along the length of the assembly, a plurality of control guide tubes interspersed throughout the rod assembly, and a top end fitting or cap. The assembly is installed and removed from the reactor as a unit.

When the fuel rods have expended a large amount of their available energy, they are considered to be "spent" and the fuel rod assembly is pulled from the reactor and temporarily stored in an adjacent pool until the assemblies are transported to a reprocessing center or to permanent or temporary storage. Even though the rods are considered "spent" they are still highly radioactive and constitute a very real hazard both to personnel and to property In general, there are a number of alternatives available for disposition of the fuel assemblies, none of which is totally satisfactory. The fuel assemblies can be enclosed in a suitable basket and cask arrangement and shipped to a storage facility, or possibly, to a reprocessing plant. This is an expensive process, and since reprocessing of fuel has been deferred by the United States government, limited as to possible destinations.

A second alternative is to store the spent fuel in a dry storage system. Dry storage entails either the use of a large number of metal casks or the building of massive concrete containers either above or below ground, which is a very expensive process, and, where the storage system is above ground, not very conducive to the peace of mind of the indigenous population. A third alternative, and the one to which the present inventions is directed, is the storage of the fuel units in the existing water pool originally designed for temporary storage. This type of storage is the simplest and cheapest, since the fuel rod assemblies can remain in the pool and be left there until the appropriate governmental agency collects them, often at the end of the life of the nuclear plant. However, such storage pools have a limited capacity, and, where they are adjacent to the reactor, necessitate the construction of a new pool when one becomes full.

Numerous attempts have been made to increase the capacity of a pool through a process known as fuel rod compaction or consolidation. This process, in brief, comprises removing the rods from the assembly and placing them in a storage canister where they are placed in racks with minimal spacing. It is possible, with this process, to place the rods from two or more fuel assemblies into a single canister, thereby achieving approximately a 2:1 reduction in required pool volume. However, successful consolidation has been an elusive goal for a number of reasons. Since the pools are approximately forty feet deep, and inasmuch as the rods must remain immersed at all times, all of the consolidation operations must be performed under the shield and cooling water. In addition, even though the rods are kept under water, the process could be quite hazardous to personnel performing the operation.

Prior art arrangements for achieving rod consolidation have included a system whereby the rods are pulled out row-by-row, as in, for example, a 14×14 matrix of rods, lifted and deposited in a tapered interim storage container, which tapers from a large area top opening to a bottom that has the area of a storage canister. After the intermediate container has the rods from approximately two fuel assemblies deposited therein, the intermediate container is placed over a storage canister, the bottom of the tapered container is lowered to cause the rods to slide into the storage canister. If the rods jam or stick, as they often do, they must be pushed from above the pool by long rods. This last operation is made more difficult in that the rods develop on their outside surfaces what is referred to in the trade as "crud". When the rods are pulled, this radioactive crud is scraped off and clouds the water making it difficult for the operators to see what they are doing and contaminating the pool. The method just described has proven to be quite slow and complicated, and could be hazardous to personnel. Various other prior art systems and method have been developed, none of which has proved to be wholly satisfactory.

SUMMARY OF THE INVENTION

The present invention is a method and apparatus for accomplishing rod consolidation expeditiously and economically, while reducing hazards to personnel.

The system of the invention comprises a commercially available five or six axes robot mounted on the operations floor along the side of the storage pool. Directly below the robot within the pool, at a depth of, for example, twenty-five feet, is an apertured work table, and resting on the floor of the pool directly below the work table is a header and support base, which includes a manifold for a pair of vacuum filter assemblies which are mounted to, and extend upwardly from, the support base. Extending vertically between the support base and into openings in the work table are a plurality of holders configured to support fuel assemblies or canisters, which are accessible from above the work table. The work table has openings to accommodate, for example, eight holders; two fuel rod canister holders, two scrap canister holders and four fuel assembly holders. At least one of the fuel rod canister holders is tiltable, by suitable means such as a hydraulic cylinder and piston arrangement to an angle of approximately ten degrees to the vertical, with the bottom thereof swung outwardly from the support base. Adjacent to the fuel rod holders, which are at one end of the work table, is a guide curtain mounted on a frame having an indexing control, inclined at the same angle to the vertical. Mounted above the work table are a plurality of commercially available video cameras having integral lighting, whose combined field of view covers the entire work table. The camera outputs are connected to image processors and a computer located at a monitoring station on the deck. The computer is programmed to control the rod compaction process and may utilize the video inputs to enhance the control of the robot.

A plurality of individual or multiple purpose long reach tools are mounted on racks above and to either side of the work table. Each of the tools has a quick change coupling mounted to its upper end which matches and is adapted to couple with a corresponding quick change coupling on the end of the robot arm.

Adjacent the top of one of the scrap canister holders is a guide tube compactor, and adjacent the top of another of the scrap canister holders is a spacer grid compactor, the guide tubes and spacer grids being part of the fuel rod cell assembly.

Locating pins are mounted on the top surface of the work table, and a position sensor carried by one of the long reach tools sends signals to the computer to give precise locations on the work table, thereby enabling the computer to determine the exact location of all components in the system.

In operation, three or four spent fuel assemblies are transferred, under water, to the spent fuel holders as dictated by the number of cells provided in the work table for fuel assemblies. Empty rod and scrap canisters are transferred to the rod canister holders, and to the scrap canister holders. The robot then couples to a long reach tool which unlocks the lid of the empty rod canister at the tiltable station. The tool is returned to the rack after the lid is placed in a storage receptacle, or the tool may simply store the lid by continuing to hold it. The rod canister holder is then rotated approximately ten degrees from the vertical, and the guide curtain is inserted therein and indexed to its starting position, i.e., one rod thickness away from the lower sloping wall of the canister. The upper end fittings of the fuel rod assemblies are then cut away by a long reach tool having a cutter on its lower end and placed in a scrap canister.

The computer next directs the robot to couple with a fuel rod transfer tool having a collet for grasping a fuel rod and pulling it out of the rod assembly up into the tool. When this occurs, crud is scraped off of the rod, but, because of the downward water current created by the filter units with their associated pumps, the crud passed down the holder into the manifold and up through the filter, thereby preventing clouding of the water and contamination of the pool.

To insure that the rod transfer tool centers exactly over a rod to be pulled, an apertured funnel guide plate has been placed over the fuel rod assembly, which precisely locates every fourth rod in the assembly. The funnel guide plate is indexed by means of locating pins that fit into holes in the work table or by slots on the underside of the plate that engages the top edges of the canister so that ultimately all of the rods are pulled. After the rod is pulled, the fuel assembly member, rod location, date, and time are recorded by the computer. The tool containing the rod is then transported by the robot to the tilted rod canister, where it is tilted at approximately a ten degree angle to match the canister and the rod is then released between the curtain and the canister wall with the rod location and time of release being recorded. The curtain contains guiding means such as projections, grooves, or ridges for insuring that the rod goes straight throughout the length of the canister, and is correctly positioned. The process is continued commencing with the center of a row and then to right and left until the row is completed. The guide curtain is then moved back one row and one-half of a rod diameter to the side. The second row, and all subsequent rows, are filled in the same way. When the next to last row has been filled, the curtain is withdrawn and the final row is filled. When the canister is completely filled, the canister is rotated back to the vertical position and the lid is replaced and secured with tamper indicating fasteners.

After consolidation is complete, the skeleton of the fuel rod assembly, consisting of guide tubes, grids, and the bottom end fitting, is subjected to compaction. The guide tubes are cut above and below the grids, and each tube section is fed into the tube compactor where it is repeatedly cut and flattened into small pieces and then dropped into the scrap canister. Finally the grid spacers are introduced into the grid compactor where they are crushed into a block by one or more hydraulic presses and are then dropped into the same or a different scrap canister. The use of two or more scrap canisters allows segregation of scrap on the basis of radioactivity level.

From the foregoing it can be seen that a relatively simple, economical system for rod consolidation is achieved while at the same time personnel are not required to perform any of the hazardous consolidation functions. These and other advantages and features of the present invention will be more readily apparent from the following detailed description, when read in conjunction with the accompanying drawings.

DESCRIPTION OF THE DRAWINGS

FIGS. 3A, 3B, 3C, 3D and 3E are perspective, partially cutaway views of a portion of the rod consolidation apparatus; and FIG. 4 is a perspective view of a portion of the fuel rod removal apparatus.

DETAILED DESCRIPTION

Figure 1:
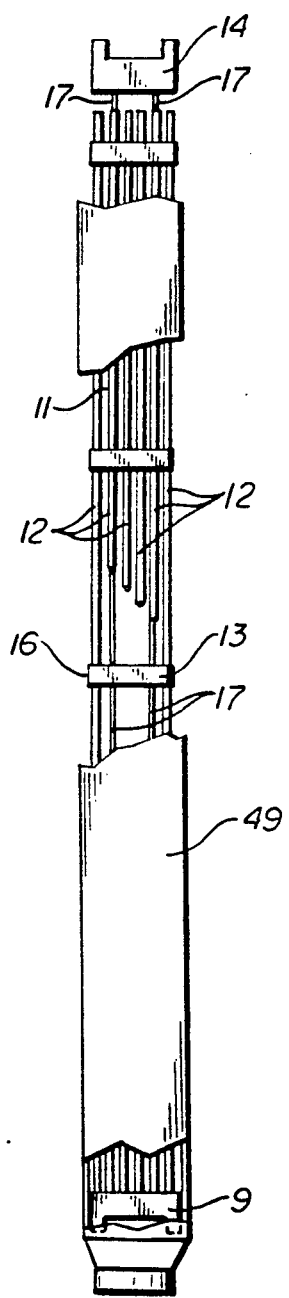
FIG. 1 is an elevation, partially cutaway view of a fuel rod assembly contained in a holder.

In FIG. 1 there is shown a fuel assembly 11, which comprises a plurality of fuel rods 12 mounted in a holder or skeleton 13 which comprises a top end member 14, a plurality of grids 16, and a plurality of guide tubes 17 which extend along the approximately fourteen foot length of the fuel assembly 11 to a bottom end fitting 9. The fuel assembly 11 is mounted in a fuel assembly or cell holder 49 of generally rectangular cross-section. The present invention is directed toward removing the fuel rods from two or more fuel assemblies 11 and packing them in a fuel rod canister, not shown in FIG. 1, and then disposing of the various parts of the now empty skeleton by chopping them up, compressing them, and depositing in scrap canisters.

Figure 2:
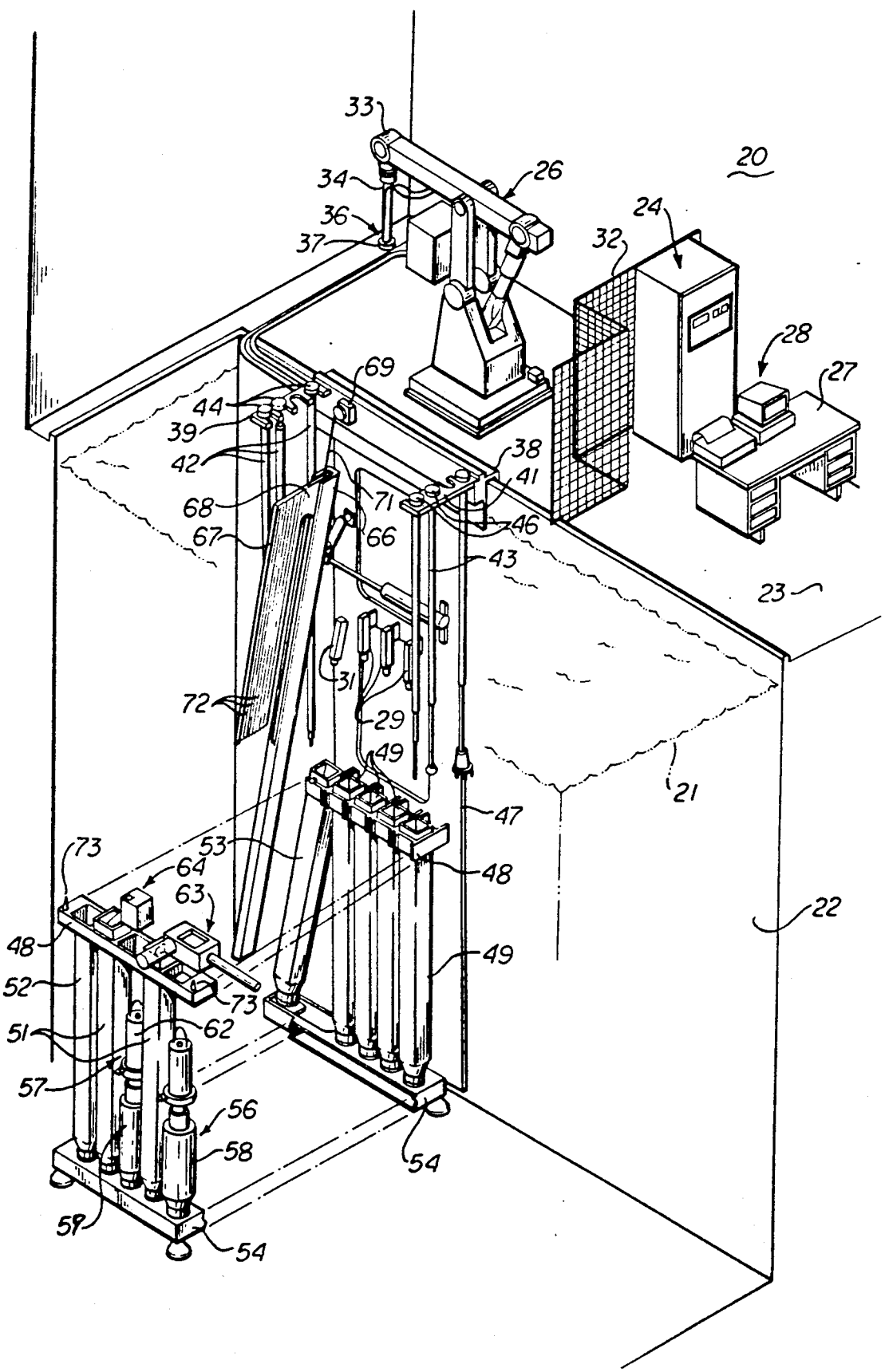
FIG. 2 is a perspective view of the apparatus of the present invention.

FIG. 2 depicts the various elements of the rod consolidation system 20, a majority of the components of which remain below the water line 21 of the storage pool 22. At the top of pool is a deck 23 adjacent thereto which has thereon the major control components of the system 20. These components comprise a computer 24 which controls a five or six axes commercially available robot 26 which is, in turn, the activating manipulator for the system 20 and the method of rod consolidation. All of the functions of the system and steps of the method, with a few exceptions, are performed by the robot 26 and its associated tools under control of the computer 24. Adjacent computer 24 is a monitoring station 27 which includes a closed circuit television monitor 28, the signals for which are received from a plurality of underwater television cameras 29 and 31, as will be explained more fully hereinafter. A protective wire cage 32 protects both the operator and the equipment from any accidental contact with the robot 26.

Attached to the free or distal end 33 of the arm of robot 26 is a shaft 34 having, at its lower or distal end 36 a quick change coupler 37. Quick change couplers are commercially available items, and any of a number of types of such couplers may be used.

A bracket 38 mounted on a curb at the top of the pool 22 has mounted thereto first and second tool racks 39 and 41 for holding a plurality of long reach tools 42, 42 and 43, 43, each having, at its top end, a quick change coupler 44 and 46 that matches quick change coupler 37. Each of the tools 42 and 43 is designed to perform a specific task, and when that task is to be performed, the robot removes that tool from the rack by means of the coupling, transfers it to the desired position, pauses while the tool performs its task, and returns it to the rack. This arrangement has the important advantage of enabling almost all of the steps of the consolidation process to be performed within the pool, without the necessity of active human intervention.

Also mounted to bracket 38 is a depending frame member 47 to which is mounted a work table 48, shown exploded in FIG. 2. Work table 48 has mounted in apertures therein four fuel rod assembly holders 49, 49, 49, 49 two scrap canister holders 51, 51, and two fuel rod canister holders 52 and 53. Holders 49, 51, 52, and 53 rest in apertures in a support base 54, which also functions as a manifold for a pair of vacuum filter assemblies 56 and 57, each comprising a filtering element 58, 59 and a pump 61, 62. Also mounted on work table 48 adjacent one of the scrap canister holders 51 is a grid compacting apparatus 63 and mounted on table 48 adjacent another of the scrap canister holders 51 is a guide tube chopper and compactor 64. Both compactors 63 and 64 have foldable chutes (not shown) for emptying the compacted trash into its adjacent scrap canister. The remaining trash canister in its holder 51 is for other scrap that is not compacted.

As can be seen in FIG. 3, the rod canister holder 53 is tilted at an angle of approximately ten degrees to the vertical. This is it operating position. In the nonoperating position holder 53 is in a vertical position along with the other holders. The mechanism (not shown in FIG. 2) for moving holder 53 between its non-operating and operating positions will be discussed more fully with regards to FIG. 3.

Television camera 29, 29, 29 and 31 are mounted to frame 47 above the table 48, and camera 31 is inclined at a ten degree angle to match the inclination of holder 53 in its operating position. The cameras are commercially available items having zoom lenses and integral lighting contained in waterproof housings. The cameras monitor the operation of the system, and more particularly, the location of the long reach tools 42 and 43 during operation. It is possible, using the cameras in conjunctions with the computer 24 and the robot 26, to position the distal or operative end of each tool to within twenty one-thousandths of an inch, thereby exceeding any accuracy obtainable when the tools are manipulated by other means.

Suspended adjacent holder 53 is an elongated track member 66 inclined at a ten degree angle to the vertical. A guide curtain 67 is mounted to a guide curtain holder 68 which slides in track member 66. Up and down movement of holder 68 and hence curtain 67 is controlled by a small winch 69 and cable 71 attached to holder 68. The curtain 67, shown in its raised position, is always maintained at a ten degree angle, regardless of its vertical position. In addition, as will be seen in FIG. 3, holder 68 and curtain 67 can be indexed sideways approximately one-half of a rod width. Curtain 67 has a plurality of grooves 72 running its entire length for guiding fuel rods.

Mounted on table 48 at the corners thereof are locator pins 73. One of the long reach tools carries an electromagnetic locator member thereon. Before operations are begun, this locator is placed over each of the locator pins 73 in turn and it generates an electrical signal which is transmitted to the computer. The combined inputs of the locating pins 73 enables the computer to determine the precise location of all of the various elements on the work table.

FIGS. 3A through 3E are perspective partial views of the apparatus for moving rod holder 53 and the apparatus for moving curtain 67. Rod holder 53 is moved by means of a hydraulic cylinder 74 and piston 76, the distal end of piston 76 being pivotably mounted to the bottom of holder 53 at 77. Under command from the computer, holder 53, in its non-operating vertical position, is moved by cylinder 74 and piston 76 to an inclined position of ten degrees to the vertical. Holder 53 has, at its upper end, pivot pins 70, only one of which is shown, which ride in grooves 75 in the frame of table 48, thus permitting holder 53 to rotate through the 10 degrees Cylinder 74 is mounted on frame 47, or it may he mounted on support plate 54.

Track member 66 is pivotally mounted at a point above canister holder 53 to a crank arm 78 by means of a pivot pin 79. Crank arm 78 in turn is pivotally mounted to frame 47 by means of pivot pin 81. The other end of crank arm 78 is pivotally connected to the end of a ball screw drive assembly 82 by means of a clevis 83 and pin 84. Ball screw 82 is actuated by a hydraulic or electric motor 86 which is mounted to frame 47 by mounting means 87. In a like measure, a crank arm 88, pivot 89, power unit 91, ball screw 92, clevis 93 and pin 94 are attached to track member 66 adjacent the lower end thereof.

Figures 3A, 3B:
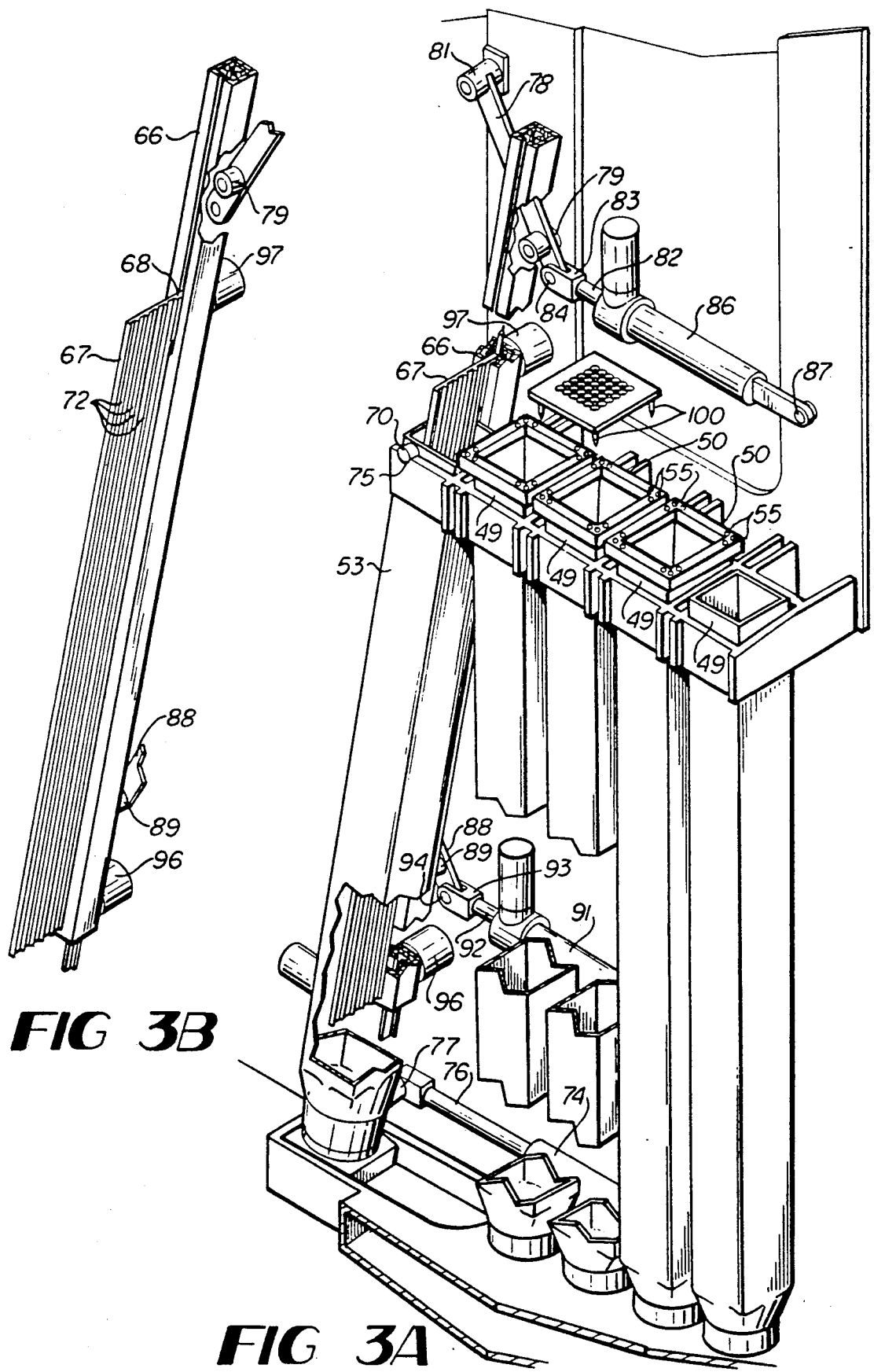

In FIG. 3B, curtain 67 and holder 68 are shown mounted in member 66 in a down, non-operating position, the curtain being outside of fuel rod canister holder 53. In operation of the system, the operative position of curtain 67 is in the down position, inside of the fuel rod canister inside of holder 53, as best seen in FIG. 3A. To move curtain 53 from the position shown in FIG. 3B to the position shown in FIG. 3A, winch 69 through cable 71 first pulls the curtain 67 upward in member 66 until it clears the top of holder 53. Ball screws 82 and 92 are then actuated to swing member 66 to the operative position shown in FIG. 3A and the curtain is then lowered into the empty canister in holder 53 spaced from the sloping lower wall of the canister by approximately one fuel rod diameter. As was pointed out in the foregoing, after the first row of rods is in place, the curtain is moved back one rod row or approximately 0.866 rod diameters, by means of ball screws 82 and 92 moving the entire curtain assembly, and one-half a rod diameter laterally. To move the assembly laterally, first and second indexing cylinders and pistons 96 and 97 are provided which move holder 68 within member 66 laterally between two positions, as shown in FIGS. 3D and 3E. The arrangement of first and second cylinders 86 and 91, crank arms 78 and 88, and pivot connections 79 and 89 is such that the curtain assembly of member 66, curtain 67, and holder 68 can be moved as a unit without deviating from the approximately ten degree inclination of the assembly.

Also shown in FIG. 3A is a funnel plate guide 101 having a top portion 103 and a plurality of spaced indexing pins 100 on the under side thereof. At least two of holders 49 have flanges 50 formed at the top thereof. Flanges 50 have a plurality of indexing holes 55 drilled therein into which indexing pins 100 fit. The spacing of holes 55 and pins 100 is such that guide plate 101 can be indexed to any of four positions.

Top portion 103 has an array of funneled holes 113, 113 therein and extending therethrough. These funnels 113 function to guide the rod removing tool 114 so that it is centered over a fuel rod in holder 49 as seen in FIG. 4. Because of the funnel shape of the holes 113, guide plate 101 can only guide the tool 114 over every fourth rod in the fuel rod assembly, but with the four position indexing provided by holes 55 and pins 100, the tool eventually accesses all of the rods. The guide plate 101 is moved by one of the long reach tools adapted to pick it up and insert the walls of holder 49 into different slots.

Tool 114, as shown in FIG. 4, has a rod grasping means, such as a collet, not shown, which grasps the rod over which it is centered and pulls it up inside of the tool for substantially its entire length. As the rod is pulled out of the rod assembly, radioactive "crud" is scraped from the rod, which is pulled down through the holder by the water current created by pumps 61 and 62 and forced through filter elements 58 and 59. This action assures that the water will remain clear for the monitoring cameras 29 and 31 to create a clear picture and prevent radioactive contamination of the pool. Guide plate 101 and funneled holes 113 function to guide the tool, support the bottom of the tool to take the reaction load of breaking a rod free, and reduce the close area at the top of the holder to give a greater downward water flow velocity to prevent crud from swirling upward and out into the pool.

Also shown in FIG. 4 is a modified guide plate 101 having a different indexing arrangement. Guide plate 101 has a top portion 103 having upper and lower surfaces. Offset depending sides 104 and 106, only two of which are shown, depend from the lower surface of top portion 103. The depending sides 104 and 106 form a shoulder 107 with the lower surface of portion 103. Each of depending sides 104 has a pair of spaced slots 108 and 109 and each of depending sides 106 has a pair of spaced slots 111 and 112. The slots are so dimensioned that the walls of holder 49 can fit snugly therein, and are so spaced that when, for example, a wall of holder 49 is in slot 109, slot 108 is offset from the other wall so that shoulder 107 rests on top of the remaining walls. When a wall of holder 49 is in slot 108, slot 109 is offset. The same is true of slots 111 and 112, so that guide plate 101 can be indexed to four discrete positions on top of holder 49.

After the rods have been removed from the rod assemblies and placed in the canister in holder 53, the skeleton remaining in holder 49 is converted to scrap, by means of long reach cutting tools and compactors 63 and 64. As portions of the fuel assembly are cut away, means, not shown, are provided for raising the skeleton in holder 49 so that the cutting tools have access thereto.

The operation of the apparatus of FIGS. 2, 3, and 4 is as follows. An empty fuel rod canister is placed in holder 53 and three or four fuel assemblies 11 are transferred, under water, to holders 49, and empty scrap canisters are transferred to holders 51. Under command from computer 24, robot 26 couples to a long reach tool for unlocking and removing the lid of the empty rod canister in holder 53. The lid can be stored or held by the tool after the tool is returned to its rack 39 or 41. Cylinder and piston assembly 74 and 76 then moves the lower end of holder 53 outwardly so that it is inclined at an angle of approximately ten degrees. Winch 69 pulls curtain 67 up until it clears the top of holders 53, and drive motors 91 and 86, power the ball screws 82 and 92 to move track member 66, and hence curtain 67 toward holder 53 until curtain 67 is above the canister within holder 53. Winch 69 then lowers the curtain into the canister, spaced one rod diameter from the lower sloping wall of the canister. The process is monitored by means of the cameras 29 and 31 and the monitor 28.

The robot next selects a long reach tool having a cutter or cutters on the distal end thereof, and the top 14 of the fuel rod assembly 11 is cut away and lowered into a scrap canister.

After returning the cutting tool to the rack 39 or 41, the computer directs the robot to couple with a suitable tool to place funnel guide plates 101 onto holders 49 and then return the tool to rack 39 or 41. The robot then couples to a fuel rod transfer tool 114 which is guided to the fuel rods by guide plate 101. The tool grasps the top of a rod and pulls it up out of the rod assembly into the tool 114. After the rod is within tool 114, robot 26 tilts shaft 34, and hence tool 114 to the angle of holder 53, and swings over so that the tool 114 may release the rod into the space between curtain 67 and the lower sloping wall of holder 53. The row defined by curtain 67 and the wall is filled from the center outwardly. After enough rods have been removed and deposited in the canister to fill the row, the curtain 67 is moved back one row by means of ball screws 82 and 92, and laterally one-half of a rod diameter by cylinders and pistons 96 and 97, and the second row is then started. After all of the rods exposed by the holes 113 in plate 101 have been removed from the fuel rod assembly, plate 101 is indexed to a different position by means of pins 100 and holes 55 thereby exposing a new set of rods. The process continues until all of the rods have been removed from the fuel assembly, and then operations are started on a second rod assembly and continued until the canister is filled. When all but the last row of rods has been inserted in the canister, winch 69 removes curtain 67 from the canister and it and member 66 are returned to their non-operating position. During the curtain removal operations, the rods within the canister remain in place due to the inclinations of the canister. In practice, the rods of two or, in some cases, the rods of slightly more than two fuel assemblies can be consolidated into a single canister, thus making better use of the available storage space.

After the rod assembly has been emptied, leaving only a skeleton comprising guide tubes 17, grids 16, and lower end potting 9, the skeleton is elevated enough to enable cutters on a long reach tool to cut the guide tubes 17, to cut the grids 16 from the guide tubes 17, and to continue doing so until the skeleton is all cut down. The pieces of guide tubes are deposited in compactor 64 where they are repeatedly cut and compacted and then dropped into the adjacent scrap canister 51. The grid spacers 16 are deposited in compactor 63 where they are crushed into semisolid blocks and then dropped into the adjacent canister 51.

In the Figures, the various electrical and hydraulic connections have not been shown for the sake of avoiding confusion. It is to be understood that such connections are self-evident and readily understandable to workers in the art.

The apparatus and method of the present invention have been illustrated in a preferred embodiment thereof, which represents a relatively simple and economical way of achieving spent fuel rod consolidation with a minimum of exposure of personnel to radioactivity. It will be readily apparent that various changes and alterations may occur to workers in the art without departure from the spirit and scope of the invention.

I claim:

1. Apparatus for the consolidation of nuclear fuel rods and compaction of their structural member within a storage pool comprising:
   a multi-axis computer controlled robot mounted above the pool, said robot having an operating arm adapted to be swung over the pool, said arm having a distal end to which is mounted a depending shaft, said shaft having a distal end to which is mounted coupling means,
   a frame member extending vertically within the pool below said robot,
   an apertured work table mounted to said frame member within the pool, said work table having a plurality of vertically extending holders mounted in the apertures thereof, at least a first one of said holders being a fuel assembly holder, and a second one of said holders being adapted to hold a fuel rod canister therein,
   means for tilting said second one of said holders at an angle to the vertical,
   rod guiding means for guiding fuel rods into a fuel rod canister within said second one of said holders,
   a plurality of long reach tools mounted adjacent said frame, at least one of said tools having first and second ends and having coupling means adapted to couple to said coupling means on said shaft mounted on the first end and fuel rod grasping means adapted to grasp a fuel rod at said second end,
   tool guide means for guiding said second end to a location directly over a fuel rod in the fuel assembly, said tool guide means comprising a plate having a plurality of apertures therein and adapted to be mounted to said fuel assembly holder, locating means affixed to said plate and locating means on said fuel assembly holder adapted to cooperate with each other to position said apertures accurately over the fuel rods in the fuel assembly, and said robot controlled tool being adapted to pull a fuel rod out of the fuel rod assembly and to insert it into the spent fuel rod canister.

2. Apparatus as claimed in claim 1 wherein the apertures in said plate are funnel shaped.

3. Apparatus as claimed in claim 1 wherein said locating means affixed to said plate and said locating means on said fuel assembly holder are adapted to index said plate to a plurality of different positions over the fuel assembly.

4. Apparatus as claimed in claim 1 and further including means for moving said rod guiding means from a non-operating position outside of said second one of said holders to an operating position within the fuel rod canister within said second one of said holders.

5. Apparatus as claimed in claim 4 and further including means for indexing said rod guiding means from side to side within the fuel rod canister.

6. Apparatus as claimed in claim 1 and further comprising a support base and manifold member into which the ends of said holders remote from said work table open.

7. Apparatus as claimed in claim 6 and further comprising pump and filter means mounted to said base and manifold member for filtering the water in the pool.

8. Apparatus as claimed in claim 1 wherein a third one said plurality of holders is adapted to hold a scrap canister, and first compacting means mounted on said work table adjacent said third one of said holders.

9. Apparatus as claimed in claim 8 wherein a fourth one of said plurality of holders is adapted to hold a scrap canister, and second compacting means mounted on said work table adjacent said fourth one of said holders.

10. Apparatus as claimed in claim 1 wherein at least one of said long reach tools has first and second ends, coupling means adapted to couple to the coupling means on said shaft mounted on said first end, and cutting means mounted on said second end, said cutting means, under control of said robot, being adapted to cut the remains of fuel rod assembly after the fuel rods have been removed.

11. Apparatus as claimed in claim 1 wherein said rod guiding means comprises an elongated movable curtain.

12. Apparatus as claimed in claim 11 wherein said curtain has a plurality of longitudinally extending grooves.

13. Apparatus as claimed in claim 12 wherein said curtain is mounted to a guide curtain holder, said holder being slidably mounted in a track member extending adjacent said curtain and substantially parallel thereto.

14. Apparatus as claimed in claim 13 and further including means for indexing said curtain laterally within the fuel rod canister within said second one of said holders.

15. Apparatus as claimed in claim 14 wherein said means for indexing indexes said curtain one-half of a rod diameter laterally after a row of rods has been placed in the fuel rod canister.

16. Apparatus as claimed in claim 1 and further including locating pins mounted at at least two corners of said work table.

17. Apparatus as claimed in claim 16 wherein at least one of said long reach tools has first and second ends, coupling means adapted to couple to the coupling means on said shaft mounted on said first end, and position sensing means mounted on said second end, said position sensing means, under control of said robot, being adapted to receive each of said locating pins sequentially and to generate signals indicative of the position of the robot arm relative to the work table.

18. Apparatus as claimed in claim 1 and further including underwater video cameras mounted to said frame member above said work table for visual monitoring of the operation of the apparatus and providing tool position correction signals.

* * * * *